Patented Aug. 28, 1951

2,565,493

UNITED STATES PATENT OFFICE 2,565,493

METHOD FOR THE PREPARATION OF SULFURIZED PARAFFINS

Robert H. Gardner, Munster, Ind., assignor to Sinclair Refining Company, New York, N. Y., a corporation of Maine No Drawing. Application November 15, 1947, Serial No. 786,327

6 Claims. (Cl. 260—139)

This invention relates to the production of a novel class of chemical compounds and, more particularly, to sulfurized paraffinic hydrocarbons. The invention provides a novel process whereby my new compositions of matter may, with advantage, be prepared.

My new chemical compounds are of particular utility as lubricating oil additives and are especially effective oxidation inhibitors in crankcase oils, as more fully described and claimed in my copending application Ser. No. 786,328 filed concurrently herewith.

It has previously been proposed to react a sulfur chloride with an olefinic hydrocarbon. No practical method has heretofore been available, to my knowledge, for reacting a sulfur chloride with a saturated hydrocarbon, i. e., a paraffinic hydrocarbon. Previous reports of efforts to effect such reactions have indicated that with straight chain paraffins, the reaction is very slow resulting in the formation of chloro-hydrocarbons and free sulfur and that, with branched paraffins, chloro-hydrocarbons are formed.

I have found that sulfur chloride may be caused to react with paraffinic hydrocarbons containing one or more tertiary carbon atoms in the presence of anhydrous aluminum chloride, resulting in a novel class of stable sulfur-hydrocarbon compounds containing but small proportions of chlorine.

Predicated upon my discovery, my present process comprises reacting a sulfur chloride, either sulfur monochloride or sulfur dichloride, with a paraffinic hydrocarbon containing a tertiary carbon atom in the presence of anhydrous aluminum chloride. It will be understood that, in referring to a paraffinic hydrocarbon containing a tertiary carbon atom, I mean a saturated hydrocarbon containing at least one carbon atom which is attached to one hydrogen atom and three other carbon atoms, for instance, iso-octane.

In the absence of the aluminum chloride catalyst, no substantial reaction occurs between the sulfur chlorides and the paraffinic hydrocarbon even at temperatures as high as 200° F. for prolonged periods. By including the catalyst in a mixture of the two, the reaction may be effected relatively rapidly at around room temperatures, or lower.

In carrying out the process, it is generally advantageous to add the aluminum chloride to the hydrocarbon and then chill the mixture before adding the sulfur chloride, though the chilling is not essential. The sulfur chloride should be added slowly to the hydrocarbon-catalyst mixture to avoid too rapid reaction and frequently cooling of the mixture is desirable for the same purpose. Advantageously, the addition may be spread over a period of hours, the mixture being maintained at about room temperature. During the addition of the sulfur chloride, hydrogen chloride is usually evolved in relatively large volumes and a sludge is formed in the reaction flask. After the last of the sulfur chloride has been added, it is usually desirable to stir the mixture for two to three hours at room temperature.

After the reaction has been completed, the reaction mixture is, with advantage, poured into an ice-concentrated hydrochloric acid mixture to break up any complex which may be formed by the aluminum chloride with the reactants or the reaction product. The resultant mixture is stirred for several hours and, during this period, free sulfur is frequently formed in the mixture.

The mixture is then allowed to settle, forming an organic layer and a water layer which are thereafter separated. The resultant sulfurized branched paraffins separate almost exclusively in the organic layer. However, some of these materials in emulsified form, may remain in the aqueous layer. Where it is desirable to recover from the aqueous layer any sulfurized paraffins contained therein, the water layer may be extracted with an organic solvent, for instance, iso-octane or benzene. The organic extract may then be combined with the organic layer, chilled, filtered and topped at reduced pressure to concentrate the desired sulfurized hydrocarbon which, for the most part, remains in the still bottoms. The distillate will normally contain only small proportions of combined sulfur and chlorine.

Where a heavier hydrocarbon, such as wax, is to be sulfurized by my process, the procedure is usually somewhat different. For instance, the wax will first be melted and the aluminum chloride mixed therewith. The sulfur chloride will then be added without chilling and, while the temperature of the mixture is above the melting point of the wax. Also, a higher temperature will be maintained with stirring following the addition of the sulfur chloride and the wax layer may be separated prior to the treatment with the ice-concentrated hydrochloric acid mixture.

The paraffinic hydrocarbons used in my process may be a substantially pure compound, or may be a mixture of saturated hydrocarbons containing tertiary carbon atoms, either alone or mixed with a saturated, or mixture of saturated, straight chain paraffinic hydrocarbons. One such hydrocarbon mixture which has been advantageously used, is the alkylate rerun bottoms from conventional alkylation processes and composed of hydrocarbons having an average molecular weight of about 170. Paraffin wax has also been successfully sulfurized by my present process, though to a somewhat less extent than when other isoparaffins are used, probably due to the relatively smaller proportion of tertiary carbon atoms present. There are, however, indications that the wax undergoes some isomerization in the presence of the anhydrous aluminum chloride catalyst and that the sulfurization occurs at the tertiary carbons thus formed as well as at those tertiary carbons normally present in the wax.

The proportion of the catalyst used is subject to some variation. An amount of catalyst about equal to the amount of the sulfur chloride used has been found generally satisfactory. Molar ratios of aluminum chloride to sulfur chloride as low as 0.1:1 have been found effective, but the yields have been found to decrease somewhat as this ratio is reduced from about 1:1 to about 0.1:1.

Both sulfur monochloride and sulfur dichloride have been found effective as the sulfur bearing reactant. However, the use of sulfur monochloride has been found to be somewhat more advantageous, especially in preparing a product for use as a lubricating oil additive.

The optimum ratio of sulfur chloride to paraffin hydrocarbon is also subject to some variation, apparently depending upon the nature of the paraffinic hydrocarbon, the extent of the presence of tertiary carbon atoms therein and whether the mono- or di-chloride is used. Generally, ratios of sulfur chloride to paraffinic hydrocarbons of about 1:2 to 1:4 have given desirable results.

The nature of the reaction is not fully understood, but it presently appears that the reaction takes place at the tertiary carbon atom, the hydrogen thereof being replaced by sulfur. However, it would appear that this is not the only reaction involved for the product usually contains small percentages of combined chlorine and somewhat more combined sulfur than the theoretical amount calculated for the corresponding di- or mono-sulfide. This may be due to presently obscure side reactions.

The isolated products of the reaction are generally dark liquids of undetermined molecular structure containing, as above indicated, small percentages of combined chlorine and much larger proportions of combined sulfur. The combined chlorine has been found to be in the range of 1 to 3% and the combined sulfur within the range of about 15 to 30% where iso-octane or the above identified alkylate rerun bottoms are used as the paraffinic hydrocarbon, considerably smaller proportions of each being present where paraffin wax is used as the paraffinic hydrocarbon. The above proportions are for the isolated product which has been topped. Considerably smaller proportions of both sulfur and chlorine have been found in the distillate.

The amount of combined sulfur and chlorine present will depend somewhat upon the molecular weight of the particular hydrocarbon used, the extent of the reaction, the number of tertiary carbon atoms present, and the like. As previously noted, the amount of sulfur present has generally been found to be somewhat more than the theoretical amount of sulfur for the disulfide or the monosulfide of iso-octane, for instance. It presently appears that only a part of the excess sulfur may be combined since free sulfur is appreciably soluble in the resultant sulfurized hydrocarbon product.

My invention will be further described and illustrated with reference to the following specific examples:

EXAMPLE I 456 grams (4 moles) of iso-octane was charged to a 2-liter 3-neck flask equipped with a reflux condenser, stirrer, thermometer, and dropping funnel. 133 grams (1 mole) of anhydrous aluminum chloride was added, the reaction flask cooled to 27° F. in an ice bath and 135 grams (1 mole) of sulfur monochloride was added slowly from the dropping funnel over a period of 2 hours and 15 minutes while the temperature was maintained between 65° and 75° F. A large volume of HCl was evolved and a yellow sludge formed in the reaction flask. The reaction mixture was stirred at 65° to 75° F. for 2½ hours after the last of the sulfur monochloride had been added. The reaction product was then poured into a mixture of ice and concentrated hydrochloric acid and the mixture stirred for 4 hours. Some free sulfur was formed in the aqueous mixture. A dark organic layer was separated from the water layer. The water layer was extracted with 150 cc. of iso-octane. The organic layer and iso-octane extract were then combined, washed with four 100 cc. portions of water, cooled to 27° F., filtered and topped in a Claisen flask to 180° F. bottoms temperature and 110° F. vapor temperature under an absolute pressure of 2.8 mm. of mercury. 284 grams of distillate and 156 grams of topped product were obtained. By analysis, the topped product was found to contain 25.04% sulfur and 1.95 chlorine and the distillate was found to contain 2.7% sulfur and 0.95% chlorine.

EXAMPLE II 1,368 grams (12 moles) of iso-octane was charged to a 5-liter 3-neck flask equipped as described in Example I. 399 grams (3 moles) of anhydrous aluminum chloride was added, the reaction mixture cooled to 56° F. in an ice bath and 405 grams (3 moles) of sulfur monochloride was slowly added through the dropping funnel over a period of 80 minutes while the temperature was maintained at 60° to 70° F. A large volume of HCl was evolved and the reaction mixture became a stiff yellow sludge. This was stirred for 3 hours at a temperature of 65° to 75° F. and then poured into a mixture of ice and concentrated hydrochloric acid and stirred for 4 hours. A large amount of free sulfur was separated in the water mixture. The organic and aqueous layers were then separated, the aqueous layer was extracted with three 100 cc. portions of iso-octane. The organic layer and the iso-octane extract were combined, washed with six 200 cc. portions of water, cooled to 28° F., filtered and topped to a bottom temperature of 190° F., the vapor temperature being 120° F. under an absolute pressure of 5 mm. of mercury. 585 grams of distillate and 544 grams of topped product were thus obtained. The topped product was found by analysis to contain 27.44% sulfur and 1.25% chlorine and the distillate was found to contain 2.11% sulfur and 1.12% chlorine.

EXAMPLE III 1,530 grams (9 moles) of alkylate rerun bottoms, previously identified herein, was charged to a 5-liter 3-neck flask equipped as described in Example I. 400 grams (3 moles) of anhydrous aluminum chloride was added, the reaction mixture was cooled to 53° F. and 405 grams (3 moles) of sulfur monochloride was slowly added over a period of 70 minutes while the temperature was maintained between 55° and 70° F. A fairly large volume of HCl was evolved and a dark sludge formed. The reaction mixture was then stirred for 4½ hours with the temperature slowly rising to room temperature. The reaction mixture was then poured into a mixture of ice and concentrated hydrochloric acid and stirred for 4 hours. A large amount of free sulfur was formed in the aqueous mixture. The organic and the aqueous layers were then separated, the aqueous layer was extracted with 2,500 cc. of benzene. The organic layer and the benzene extract were combined, the mixture washed with six 200 cc. portions of water, filtered and topped to a bottom temperature of 200° F. and a vapor temperature of 155° F. under an absolute pressure of 1.6 mm. of mercury. 1,088 grams of the distillate and 364 grams of the topped product were thus recovered. The topped product was then permitted to cool to room temperature and some crystals of free sulfur separated out. The product was then heated with the free sulfur to 250° F. for 4 hours in a nitrogen atmosphere and thereafter upon standing at room temperature no free sulfur precipitated. The topped product was found by analysis to contain 20.96% sulfur and 1.45% chlorine and to have an acid number of 4.8. The distillate was found to contain 4.39% sulfur and 1.22% chlorine and to have an acid number of 2.5.

EXAMPLE IV 510 grams (3 moles) of the alkylate rerun bottoms used in Example III was charged to a 2-liter 3-neck flask equipped as described in Example I and 67 grams (0.5 mole) of anhydrous aluminum chloride was added. 134 grams (1 mole) of sulfur monochloride was then added slowly while the temperature was maintained at 65° to 80° F., and the reaction mixture was stirred for 4 hours and 50 minutes with the temperature slowly rising to room temperature. Considerable HCl was evolved. The reaction product was then poured into a mixture of ice and concentrated hydrochloric acid and a large amount of free sulfur separated in the aqueous mixture. The organic and aqueous layers were then separated and the aqueous layer extracted with 100 cc. of benzene. The organic layer and the benzene extract were combined, washed with six 100 cc. portions of water, filtered and topped to a bottom temperature of 200° F. and a vapor temperature of 165° F. under an absolute pressure of 3.5 mm. of mercury. 404 grams of distillate and 82 grams of the topped product were thus obtained. After standing at room temperature some free sulfur precipitated from the topped product. The topped product, together with the free sulfur, was then heated to 250° F. for 4 hours and, after standing at room temperature only a very slight amount of free sulfur precipitated and was filtered off. The topped product was found, by analysis, to contain 19.13% sulfur and 2.28% chlorine and the distillate was found to contain 1.48% sulfur and 3.10% chlorine.

EXAMPLE V 1,368 grams (12 moles) of iso-octane was charged to a 5-liter 3-neck flask equipped as previously described. 532 grams (4 moles) of anhydrous aluminum chloride was then added and the mixture cooled to 58° F. 412 grams (4 moles) of sulfur dichloride was then added slowly through the dropping funnel over a period of 2 hours with the temperature being maintained between 65° and 75° F. A large volume of HCl was evolved and a large amount of sludge formed in the reaction flask. The reaction mixture was then stirred for 4 hours at a temperature of 75° to 85° F. and the product poured into a mixture of ice and concentrated hydrochloric acid and stirred for 4 additional hours. No free sulfur separated out in the aqueous mixture. The aqueous and organic layers were then separated; the aqueous layer extracted with 200 cc. of benzene. The organic layers and the benzene extract were combined and washed 6 times with 200 cc. portions of water. The organic liquid was then filtered and topped to 190° F. oil bath temperature and 127° F. vapor temperature under an absolute pressure of 0.8 mm. of mercury. 517 grams of distillate and 410 grams of topped product were thus obtained. The topped product was found, by analysis, to contain 17.80% sulfur and 3.54% chlorine and to have an acid number of 4.7. The distillate was found to contain 6.08% sulfur and 1.40% chlorine and to have an acid number of 2.1.

EXAMPLE VI 900 grams (2 moles) of paraffin wax having a melting point of 130 to 132° F. was charged to a 3-liter 3-neck flask, equipped as previously described. The wax was melted and heated to a temperature of 140° F. and 106 grams (0.8 mole) of aluminum chloride was added. 108 grams (0.8 mole) of sulfur monochloride was then added slowly over a period of 1 hour while the temperature was maintained at 140 to 150° F. HCl was evolved at a slow rate. The mixture was then stirred for 4 hours while the temperature was held at 195° F. The mixture was then allowed to separate and the wax layer was decanted. The remaining black sludge was then poured into a mixture of ice and concentrated hydrochloric acid and the sludge-acid mixture was stirred for 2 hours. The decanted wax layer was washed 5 times with 200 cc. portions of hot water and the resultant clear orange colored wax was filtered through filter paper in a heated funnel. 794 grams of the orange colored wax was thus obtained and 42 grams of a waxy product was recovered from the sludge. A solid portion of the sludge was also obtained which was soluble in neither water nor the wax-like product. The orange colored wax was found, by analysis, to contain 1.82% sulfur and 0.01% chlorine.

EXAMPLE VII 450 grams (1 mole) of paraffin wax used in Example VI was charged to a 2-liter flask such as there described. The wax was heated to 140° F. and 106 grams (0.8 mole) of aluminum chloride was added, whereupon the wax became dark in color. With the temperature of the mixture between 140° to 150° F., 270 grams (2 moles) of sulfur monochloride was added slowly over a period of 1¼ hours. Evolution of HCl started immediately upon the addition of the sulfur monochloride. The reaction mixture was then stirred for 4 hours at a temperature between 140° to 150° F. A stream of nitrogen was bubbled through the reaction mixture overnight with the temperature maintained between 140° to 150° F. The following morning, a clear, almost colorless, wax was decanted from the mixture, washed with six 200 cc. portions of hot water and filtered through a heated filter. 346 grams of this colorless wax product was thus obtained, which was found, by analysis, to contain 1.82% sulfur and 0.36% chlorine and to have an acid number of 16.7.

The properties of the iso-octane and the alkylate rerun bottoms used in the foregoing examples are set forth in the following Table I.

*Table I*

|  | Iso-octane | Alkylate Rerun Bottoms |
|---|---|---|
| Bromine No | 0.0 | 0.0 |
| Gravity, API | 72.2 | 53.1 |
| 100 cc. distillation: |  |  |
| I. B. P. °F | 206 | 373 |
| 10 per cent °F | 207 | 378 |
| 20 per cent °F | 207 | 380 |
| 30 per cent °F | 207 | 382 |
| 40 per cent °F | 207 | 384 |
| 50 per cent °F | 207 | 388 |
| 60 per cent °F | 207 | 392 |
| 70 per cent °F | 207 | 398 |
| 80 per cent °F | 208 | 408 |
| 90 per cent °F | 208 | 428 |
| E. P. per cent °F | 277 | 492 |
| Recovery per cent | 99.0 | 97.0 |

My new class of chemical compounds appears to differ both as to composition and structure from the reaction product of olefins and sulfur chlorides in that they contain very small proportions of chlorine, insufficient to cause corrosion when used in lubricating oil compositions, while containing relatively large proportions of sulfur, are surprisingly stable and combine the sulfur in such a manner as to be especially effective as lubricating oil additives.

I claim:

1. A process for sulfurizing paraffinic hydrocarbons which comprises the step of reacting a sulfur chloride with about a molar proportion to a substantial excess of paraffinic hydrocarbon containing a tertiary carbon atom by mixing the reactants with at least about 0.1 mol of anhydrous aluminum chloride.

2. A process for sulfurizing paraffinic hydrocarbons which comprises reacting a sulfur chloride with about a molar proportion to a substantial excess of paraffinic hydrocarbon containing a tertiary carbon atom by mixing the reactants with at least about 0.1 mol of anhydrous aluminum chloride, chilling and acidifying the reaction mixture by mixing it with an ice-concentrated hydrochloric acid mixture, settling the resultant aqueous mixture to form an aqueous layer and an organic layer and fractionally distilling the organic layer, whereby the sulfurized paraffinic hydrocarbons are concentrated in the still bottoms.

3. A process for sulfurizing paraffinic hydrocarbons which comprises reacting a sulfur chloride with about a molar proportion to a substantial excess of paraffinic hydrocarbon containing a tertiary carbon atom by mixing the reactants with at least about 0.1 mol of anhydrous aluminum chloride, chilling and acidifying the reaction mixture by mixing with an ice-concentrated hydrochloric acid mixture, settling the resultant mixture to form an aqueous layer and an organic layer, separating the layers, extracting the water layer with an organic solvent, combining the organic extract with the organic layer, and fractionally distilling the resultant mixture, whereby the sulfurized paraffinic hydrocarbon is concentrated in the still bottoms.

4. A process as in claim 1 in which the paraffinic hydrocarbon is iso-octane.

5. A process as in claim 1 in which the paraffinic hydrocarbon is alkylate rerun bottoms.

6. A process as in claim 1 in which the paraffinic hydrocarbon is paraffin wax.

ROBERT H. GARDNER.

REFERENCES CITED

The following references are of record in the file of this patent:

UNITED STATES PATENTS

| Number | Name | Date |
|---|---|---|
| 1,765,601 | McKee et al. | June 24, 1930 |
| 2,049,470 | Perkins | Aug. 4, 1936 |
| 2,123,082 | Schulze | July 5, 1938 |
| 2,218,997 | Wasson | Oct. 22, 1940 |
| 2,249,312 | Kimball | July 15, 1941 |
| 2,422,275 | Winning et al. | June 17, 1947 |
| 2,467,713 | Watkins | Apr. 19, 1949 |
| 2,472,471 | Eby | June 7, 1949 |

FOREIGN PATENTS

| Number | Country | Date |
|---|---|---|
| 298,484 | Great Britain | Feb. 10, 1930 |

OTHER REFERENCES

Lorand, Journ. Ind. Eng. Chem., June 1927, pp. 733–735.